United States Patent Office 3,776,839
Patented Dec. 4, 1973

3,776,839
HYDROCRACKING PROCESS FOR LUBE OIL
OVER Ni-Mo- AND Ni-W-on SiO$_2$-ZrO$_2$
Peter Ladeur, Amsterdam, Netherlands, assignor to Shell Oil Company, New York, N.Y.
No Drawing. Original application Nov. 4, 1971, Ser. No. 195,861, now abandoned. Divided and this application Feb. 21, 1973, Ser. No. 334,346
Claims priority, application Great Britain, Dec. 2, 1970, 57,250/70
Int. Cl. B01j *11/74;* C10g *13/06*
U.S. Cl. 208—110                5 Claims

ABSTRACT OF THE DISCLOSURE

Lubricating oil hydrocracking process utilizing catalysts comprising (a) one metal A consisting of nickel and at least one metal B selected from the group consisting of molybdenum and tungsten present on a carrier in amounts of at least about 0.01 gram-atom of metal A and at least about 0.10 gram-atom of metal B per 100 grams of carrier; (b) an atomic ratio of metal A to metal B in the range of from about 0.10:1 to about 0.75:1, and (c) a carrier composed of silica and zirconia.

RELATED APPLICATION

This is a division of application Ser. No. 195,861, filed Nov. 4, 1971, now abandoned.

BACKGROUND OF THE INVENTION

In the production of high viscosity index(HVI)-lubricating oils by hydrocracking of vacuum distillates as well as in the production of HVI- and very high viscosity index(VHVI)-lubricating oils by hydrocracking of deasphalted distillation residues, low viscosity index(VI)-compounds present in the feed such as polyaromatics are converted into high-VI compounds such as saturates, for example by dealkylation, isomerization and hydrogenation. At the same time, the nitrogen, sulfur and oxygen content of the oil is being strongly reduced.

The suitability of catalysts for use in the above-mentioned hydrocracking processes depends on their temperature requirement, their aromatics retention and their selectivity, which are defined as follows. Under given operating conditions and starting from a given feed for the preparation of a lubricating oil with a predetermined VI after dewaxing, "temperature requirement" is the temperature which should be applied to obtain said lubricating oil, "aromatics retention" is the percentage of aromatics present in said lubricating oil calculated on the aromatics content of the feed and "selectivity is the yield of said lubricating oil. Accordingly as the catalysts show a lower temperature requirement and aromatics retention and a higher selectivity, they are more suitable for the production of HVI- and VHVI-lubricating oils by hydrocracking of heavy hydrocarbon fractions.

In the past a large number of catalysts have already been proposed for the production of HVI- and VHVI-lubricating oils by hydrocracking of heavy hydrocarbon fractions. As a rule they comprise one or more metals of Groups VI-B, VII-B and/or VIII or their sulfides or oxides deposited on an amorphous refractory inorganic oxide of Group II, III or IV elements or compositions of said oxides. These catalysts may further comprise phosphorus and a halogen such as chlorine or fluorine.

An extensive investigation into the merits of catalysts of the above-described type for the production of HVI- and VHVI-lubricating oils by hydrocracking of heavy hydrocarbon fractions has revealed that their suitability for this purpose depends to a very large extent on the type and amount of metals present on the carrier and on the type of carrier.

A number of the catalysts of the above-described type proved to be completely unsuitable for the production of HVI- and VHVI-lubricating oils by hydrocracking, since their temperature requirement and aromatics retention were far too high, whereas their selectivity was far too low. Most of the catalysts showed a moderate suitability for the production of HVI- and VHVI-lubricating oils by hydrocracking. However, either the temperature requirement, or the aromatics retention or the selectivity of these catalysts was insufficient for superior catalyst performance.

SUMMARY OF THE INVENTION

A small group of catalysts of the above-mentioned type has now been found which show excellent performance for the production of HVI- and VHVI-lubricating oils by hydrocracking. The temperature requirement and aromatics retention of these catalysts is very low, whereas the selectivity is very high. These superior and novel catalysts for the production of HVI- and VHVI-lubricating oils by hydrocracking comprise the following:

(a) one metal A consisting of nickel and at least one metal B selected from the group consisting of molybdenum and tungsten present on a carrier in amounts of at least about 0.015 gram-atoms of metal A and at least about 0.10 gram-atom of metal B per 100 grams of carrier;

(b) an atomic ratio of metal A to metal B in the range of from about 0.10:1 to about 0.75:1; and (c) a carrier composed of silica and zircona.

The invention therefore relates to silica-zirconia supported catalysts comprising at least about 0.015 gram-atom of nickel (metal A) and at least about 0.10 gram-atom of molybdenum and tungsten (metal B) per 100 grams of silica-zirconia and having a metal A–metal B atomic ratio in the range of from about 0.10:1 to about 0.75:1. The invention further relates to the use of these catalysts for the conversion of hydrocarbon fractions, in particular, to their use in a hydrocracking process for the production of HVI- and VHVI-lubricating oils from heavy hydrocarbon fractions.

DESCRIPTION OF PREFERRED EMBODIMENTS

It is essential that the catalysts of the invention contain from about 0.015 to about 0.10 gram-atom of metal A and from about 0.10 to about 0.25 gram-atom of metal B per 100 grams of silica-zirconia and that the metal A to metal B atomic ratio be in the range of from 0.10:1 to 0.75:1. It is preferred, however, that the catalysts contain about 0.025–0.10 gram-atom of metal A and about 0.15–0.25 gram-atom of metal B and that the metal A to metal B atomic ratio be in the range of from about 0.2:1 to about 0.6:1.

It is further essential that the catalysts of the invention contain at least one metal A selected from the group consisting of nickel and cobalt and at least one metal B selected from the group consisting of molybdenum, tungsten and rhenium. It is preferred, however, that the catalysts contain a combination of nickel and molybdenum or a combination of nickel and tungsten.

Finally it is essential that the catalyst carrier be composed of silica and zirconia. It is preferred that the carrier be composed of about 30 to about 90% w. of silica and about 10 to about 70% w. of zirconia. It is further preferred that the catalysts have a pore volume of about 0.2 to about 0.8 ml./g. and a specific surface area of about 125 to about 300 m.$^2$/g. Any substantial deviation from the formulation of the superior catalyst of the invention leads to catalysts with a higher temperature requirement and aromatics retention and a lower selectivity and hence to catalysts which are less suitable for the production of HVI- and VHVI-lubricating oils from heavy hydrocarbon fractions by hydrocracking.

The catalysts of the invention may be prepared by any one of the techniques for the preparation of multi-component supported catalysts well-known in the art. The catalysts are preferably prepared by co-impregnating a silica-zirconia carrier with a solution of salts of one or more metal A and one or more metal B. Silica-zirconia carriers may, for example, be prepared by co-precipitation of silica and zirconia or by impregnating a silica with a solution of a zironium compound such as zirconyl chloride or zirconyl nitrate, followed by drying and calcining. In case a carrier with a high zirconia content is required, usually two or more impregnations with a solution of a zirconium compound are necessary, If desired, the catalysts of the invention may also be prepared by co-impregnating a silica with a solution comprising in addition to a zirconium compound, salts of one or more metal A and one or more metal B. Silica-zirconia carriers suitable to be used as supports for the catalysts according to the invention are preferably prepared by precipitating zirconia on a silica hydrogel followed by drying and calcining. This preparation is preferably carried out starting from an aqueous silicate solution (e.g., water glass) by decreasing the pH, as a result of which a silica hydrogel precipitates, ageing of the silica hydrogel, addition of an aqueous solution of a zirconium compound and increasing the pH as a result of which zirconia precipitates on the silica hydrogel. Ageing of the silica hydrogel is carried out by storing the gel 4–200 hours at a pH between 7 and 11 at elevated temperature. During ageing the pore volume of the carrier increases and the specific surface area decreases, as a result of which the material becomes more suitable for catalytic purposes.

If desired, the catalysts of the invention also may contain halogen, such as fluorine.

The metals may be present on the carrier either as such or as metal oxides or metal sulfides. The catalysts are preferably used in their sulfidic form. Sulfidation of the present catalysts may be carried out by any one of the techniques for sulfidation of catalysts well-known in the art. Sulfidation may, for instance, be carried out by contacting the catalysts with a sulfur-containing gas such as a mixture of hydrogen and hydrogen sulfide, a mixture of hydrogen and carbon disulfide or a mixture of hydrogen and a mercaptan, such as butyl mercaptan. Sulfidation may also be carried out by contacting the catalyst with a sulfur-containing hydrocarbon oil, such as a sulfur-containing kerosene or gas oil.

The catalysts of the present invention are of special importance when they are used as catalysts in a hydrocracking processing for the production of HVI- and VHVI-lubricating oils from heavy hydrocarbon fractions such as vacuum distillates and deasphalted distillation residues. Suitable starting materials for the process according to the invention are high boiling hydrocarbon mixtures, e.g., heavy petroleum fractions and heavy fractions obtained by pyrolysis of coal, bituminous shale or tar sand. Petroleum fractions boiling at least in part above the boiling range of lubricating oil may be used to advantage. As feed for the present process use may be made of a distillate fraction recovered by vacuum distillation from a residual oil fraction obtained by atmospheric distillation. However, deasphalted residual petroleum fractions are preferred.

Hydrocracking of high boiling hydrocarbon feedstocks for the production of HVI- and VHVI-lubricating oils according to the invention is carried out by contacting the high boiling hydrocarbon feedstock in the presence of hydrogen at elevated temperature and pressure with a catalyst of the invention. The effluent of the hydrocracking reactor is cooled and separated into a hydrogen-rich gas and a liquid product. The liquid product contains hydrocarbons boiling below the boiling range of lubricating oil and hydrocarbons boiling within said range. The hydrocarbons which boil below said range are separated from the higher boiling residue, preferably by fractional distillation. The cut point of this distillation is preferably so selected that the higher-boiling residue has an initial boiling point in the range of from 350 to 550° C. In addition to excellent lubricating oil components, this residue generally contains normal paraffins which solidify at ambient temperature and consequently have an unfavorable effect on the pour point of the lubricating oil. In order to produce a suitable lubricating oil from the residue, it is therefore preferred to dewax this residue. The dewaxing treatment can be carried out in any manner desired. Dewaxing is preferably effected by means of a mixture of methyl ethyl ketone and toluene at a temperature between —10° C. and —40° C. and at a solvent-to-oil volume ratio of between 1:1 and 10:1.

Suitable hydrocracking conditions are a temperature of from 350 to 450° C., a pressure of from 50 to 250 kg./cm.$^2$, a hydrogen/feed ratio of from 100 to 5000 standard liters (liters at 14.5 p.s.i. and 0° C.) [Nl.] of hydrogen per kg. feed and a space velocity of from 0.2 to 5.0 kg. feed per liter catalyst per hour. It is preferred to apply the following conditions: a temperature of from 375 to 425° C., a pressure of from 100 to 200 kg./cm.$^2$, a hydrogen/feed ratio of from 500 to 2500 Nl. hydrogen per kg. feed and a space velocity of from 0.5 to 1.5 kg. feed per liter catalyst per hour.

In addition to their use as catalysts in hydrocracking processes for the production of HVI- and VHVI-lubricating oils from heavy hydrocarbon fractions, the catalysts of the invention are also suitable to be used in other catalytic hydrocarbon conversion processes, especially processes in which the hydrocarbons are converted in the presence of hydrogen.

Advantageous results have been obtained by the use of the catalysts of the invention as first-stage catalysts in a two-stage hydrocracking process for the production of naphtha from flashed distillate.

EXAMPLES

Preparation of silica-zirconia carriers

Two silica-zirconia carriers containing 50% w. of silica and 50% w. of zirconia were prepared as follows. First a silica hydrogel was prepared by adding with stirring 440 ml. of 6 N HNO$_3$ to a solution of 1000 g. of water glass (26.5% SiO$_2$) in 3500 ml. of water. After ageing of the silica hydrogel for 24 hours at 50° C., a solution of 693 g. of ZrOCl$_2$·8H$_2$O in 2800 ml. of water was added thereto and subsequently in 30 minutes, with stirring, 300 ml. of concentrated ammonia (25% NH$_3$). After stirring for another 15 minutes the solid material was filtered and washed with water. From this material two silica-zirconia carriers were prepared. Carrier 1 was prepared by successively drying the material for 16 hours at 120° C., calcining fo 3 hours at 500° C. and crushing to a particle diameter of 0.5–1.4 mm. Carrier 1 had a pore volume of 0.58 ml./g. and a specific surface area of 364 m.$^2$/g. Carrier 2 was prepared by successively extruding the material at 1.5 mm. extrudates, drying for 16 hours at 120° C. and calcining for 3 hours at 500° C.

A silica-zirconia carrier containing 80% w. of silica and 20% w. of zirconia was prepared as follows. First a silica hydrogel was prepared by adding 875 ml. of 6 N HNO$_3$ to a sodium of 1815 g. of water glass (26.5% SiO$_2$) in 5500 ml. of water. After ageing of the silica hydrogel for 140 hours at 50° C., a solution of 314 g. ZrOCl$_2$·8H$_2$O in 1500 ml. water was added thereto and subsequently in 30 minutes, with stirring, 130 ml. of concentrated ammonia (25% NH$_3$). After stirring for another 15 minutes the solid material was filtered and washed with water. From this material a silica-zirconia carrier (carrier 3) was prepared by successively drying the material for 16 hours at 120° C., calcining for 3 hours at 500° C. and crushing to a particle diameter of 0.5–1.4 mm. 0.56 ml./g. of the pore volume of carrier 3 was present in pores with a diameter of 75–80,000 A.

The composition and some of the properties of these catalysts are given in Table I.

Catalysts I–V are catalysts of the invention.

Catalysts A–J are outside the scope of the invention; they have been incorporated for the purpose of comparison.

TABLE I

| Catalyst Number | Gat/100 pbw carrier [a] | | | | Ni/Mo or W Catomic ratio | Carrier | Catalyst particle diameter, mm. | Catalyst surface area, m.²/g. | Catalyst pore volume, ml./g. |
|---|---|---|---|---|---|---|---|---|---|
| | Ni-content | Mo or W content | P-content | F-content | | | | | |
| I | 0.04 | 0.16 W | | | 0.25 | SiO₂/ZrO₂ (50/50) | 0.5–1.4 | 187 | 0.32 |
| II | 0.06 | 0.24 W | | | 0.25 | SiO₂/ZrO₂ (50/50) | 0.5–1.4 | 163 | 0.24 |
| III | 0.04 | 0.16 W | | | 0.25 | SiO₂/ZrO₂ (50/50) | 1.5 | 191 | 0.33 |
| III' | 0.04 | 0.16 W | | | 0.25 | SiO₂/ZrO₂ (50/50) | 0.5–1.4 | 191 | 0.33 |
| IV | 0.10 | 0.26 W | | | 0.38 | SiO₂/ZrO₂ (80/20) | 0.5–1.4 | 211 | 0.49 |
| A | [b]0.003 | | | | | SiO₂/ZrO₂ (50/50) | 0.5–1.4 | | |
| B | 0.05 | 0.12 Mo | 1.8 | | 0.42 | Al₂O₃ | 1.5 | 178 | 0.48 |
| B' | 0.05 | 0.12 Mo | 1.8 | | 0.42 | Al₂O₃ | 0.5–1.4 | 178 | 0.48 |
| C | 0.04 | 0.16 W | | 2.5 | 0.25 | F-containing Al₂O₃ | 0.5–1.4 | 123 | 0.32 |
| D | 0.04 | 0.15 Mo | | 2.5 | 0.27 | ...do... | 0.5–1.4 | 144 | 0.36 |
| E | 0.04 | 0.16 W | | | 0.25 | SiO₂/Al₂O₃ (80/20) | 0.5–1.4 | 387 | 1.0 |
| F | 0.06 | 0.16 W | | | 0.38 | SiO₂/MgO (70/30) | 0.5–1.4 | 291 | 0.23 |
| G | 0.06 | 0.15 Mo | 3.1 | 3.3 | 0.40 | Al₂O₃ | 1.5 | 143 | 0.41 |
| G' | 0.06 | 0.15 Mo | 3.1 | 3.3 | 0.40 | Al₂O₃ | 0.5–1.4 | 143 | 0.41 |
| H | 0.2 | 0.2 Mo | 2.5 | | 1.0 | Al₂O₃ | 0.5–1.4 | 140 | 0.25 |
| J | 0.06 | 0.15 Mo | 3.1 | | 0.25 | Al₂O₃ | 1.5 | 166 | 0.44 |

[a] Gat=gram-atom; pbw=parts by weight.
[b] Platinum content of the catalyst.
' Refers to variation in catalyst particle diameter with respect to same catalyst with no superscript.

Preparation of silica-zirconia supported catalysts

Catalyst I.—Concentrated ammonia was added to a mixture of 90 g. of carrier 1 and 900 ml. of 0.1 N $NH_4NO_3$ to give a pH of 7. The neutralized carrier was filtered and dried for 18 hours at 120° C. After neutralization, carrier 1 had a pore volume of 0.54 ml./g. and a specific surface area of 334 m.²/g.

82 grams (80 g. dry base) of neutralized carrier 1 were impregnated with a hot 80-ml. solution of 33.44 g. of $(NH_4)_{10}W_{12}O_{41} \cdot 5H_2O$, 6.05 g. of $Ni(CH_2O)_2 \cdot 2H_2O$ and 21 g. of monoethanolamine. (The tungsten and nickel salts were separately dissolved in water with the aid of monoethanolamine.) After 15 minutes the catalyst was dried for 18 hours at 120° C. and calcined for 3 hours at 500° C.

Catalyst II.—This catalyst was prepared substantially in the same way as catalyst I, but the amounts of nickel and tungsten deposited on the carrier were larger.

Catalyst III.—This catalyst was prepared substantially in the same way as catalyst I, but in this case the metals were deposited on carrier 2. (After neutralization carrier 2 had a pore volume of 0.49 ml./g. and a specific surface area of 367 m.²/g.) 0.07 ml./g. of the pore volume of catalyst III was present in pores with a diameter of 75–80,000 A.

Catalyst IV.—Concentrated ammonia was added to a mixture of 74 g. of carrier 3 and 740 ml. of 0.1 N $NH_4NO_3$ to give a pH of 7. The neutralized carrier was filtered and dried for 18 hours at 120° C.

70 grams (69.5 g. dry base) of neutralized carrier 3 were impregnated with hot 105-ml. solution of 31.95 g. of $(NH_4)_6Mo_7O_{24} \cdot 4H_2O$, 12.0 g. of $Ni(CH_2O)_2 \cdot 2H_2O$ and 35 g. of monoethanolamine. (The molybdenum and nickel salts were separately dissolved in water with the aid of monoethanolamine.) After 15 minutes the catalyst was dried for 18 hours at 120° C. and calcined for 3 hours at 500° C.

Catalyst A.—This catalyst was prepared by impregnating carrier 1 with an aqueous solution of $H_2PtCl_6$.

Catalysts B–J.—These catalysts were prepared by co-impregnation of a carrier with a solution of a nickel and a molybdenum salt or with a solution of a nickel and a tungsten salt. In case phosphorus was present in these catalysts, this phosphorus was also deposited on the carrier by impregnation. In case these catalysts contained fluorine, this fluorine was either already present in the carriers from which these catalysts had been prepared or added to the catalysts after the metals had been deposited on the carrier.

The temperature requirements, aromatics retentions and selectivities of eight of the catalysts listed in Table I in the preparation of 375+ lubricating oil having a VI of 128 after dewaxing at —20° C., were compared in an experiment carried out under the following conditions.

Feed: deasphated residue derived from a Middle East crude oil
VI of the deasphalted oil after dewaxing at —30° C.: 78
VI of the deasphalted oil after dewaxing at —20° C.: 81
Sulfur content: 2.5% w.
Nitrogen content: 780 p.p.m. by wt.
Aromatic content: 100 mmole/100 g.
Pressure: 150 kg./cm.²
LHSV: 1 l.·l.$^{-1}$·h.$^{-1}$
Gas rate: 2000 Nl.·l.$^{-1}$
Catalyst bed: 100 ml.

The catalysts were used in sulfided form. Sulfidation of the catalysts was carried out by contacting the catalysts for 5 hours with a mixture of hydrogen and hydrogen sulfide in a volume ratio of 7:1 at a temperature of 375° C. and a pressure of 10 kg./cm.². Dewaxing was carried out with a 1:1 mixture of methyl ethyl ketone and toluene.

In this experiment a superior catalyst should show a temperature requirement and aromatics retention of at most 420° C. and 30%, respectively, and a selectivity of at least 40% w.

The results of this experiment are given in Table II.

TABLE II

| Catalyst tested | Temperature requirement, °C. | Selectivity, percent wt. on feed | Properties of the lubricating oil | | Aromatics retention, percent |
|---|---|---|---|---|---|
| | | | $V_k 210°$ F. cs. | Aromatics content, mmole/100 g. | |
| I | 411 | 48 | 9.8 | 20 | 20 |
| II | 411 | 44 | 9.6 | 24 | 24 |
| A[a] | 440 | 36 | 9.0 | 80 | 80 |
| B' | 433 | 38 | 8.0 | 47 | 47 |
| C | 426 | 43 | 9.1 | 35 | 35 |
| D | 424 | 43 | 8.8 | 35 | 35 |
| E | 421 | 40 | 8.6 | 40 | 40 |
| F | 413 | 38 | 9.3 | 24 | 24 |

[a] Under the conditions used in this experiment, a lubricating oil with a VI of 128 could not be prepared with catalyst A. The figures given in Table II for catalyst A relate to the production of a 112 VI oil.

The temperature requirements, aromatics retentions and selectivities of four of the catalysts listed in Table I in the preparation of a 400+ lubricating oil having a VI of 128 after dewaxing at —30° C., were compared in an experiment carried out under the same conditions and with the same feed as the previous experiment.

In this experiment a superior catalyst should show a temperature requirement and aromatics retention of at most 420° C. and 25%, respectively, and a selectivity of at least 30% w.

The results of this experiment are given in Table III.

TABLE III

| Catalyst tested | Temperature requirement, ° C. | Selectivity, percent wt. on feed | Properties of the lubricating oil | | Aromatics retention, percent |
|---|---|---|---|---|---|
| | | | $V_k 210°$ F., cs. | Aromatics content, mmole/ 100 g. | |
| III' | 416 | 35 | 10.2 | 16 | 16 |
| IV' | 415 | 33 | 10.0 | 17.5 | 17.5 |
| B' | 433 | 27 | 9.0 | 42 | 42 |
| H | 430 | 28 | 9.2 | 34 | 34 |

The temperature requirements, aromatics retention and selectivities of three of the catalysts listed in Table I in the preparation of a 400+ lubricating oil having a VI of 125 after dewaxing at —30° C., were compared in an experiment carried out under the same conditions as the two previous experiments, but starting from a different feed. In this case the feed was a Bright Stock waxy raffinate with the following properties:

VI after dewaxing at —30° C.: 93
VI after dewaxing at —20° C.: 95
Sulfur-content: 1.6% w.
Nitrogen content: 320 p.p.m. by wt.
Aromatics content: 56 mmole/100 g.

In this experiment a superior catalyst should show a temperature requirement and aromatics retention of at most 410° C. and 25% respectively and a selectivity of at least 40% w.

The results of this experiment are given in Table IV.

TABLE IV

| Catalyst tested | Temperature requirement, ° C. | Selectivity, percent wt. on feed | Properties of the lubricating oil | | Aromatics retention, percent |
|---|---|---|---|---|---|
| | | | $V_k 210°$ F., cs. | Aromatics content, mmole/ 100 g. | |
| III' | 404 | 42 | 11.8 | 10 | 18 |
| G' | 405 | 25 | 10.5 | 18 | 32 |
| J | 413 | 34 | 11.2 | 19 | 34 |

The temperature requirements and selectivities of four of the catalysts listed in Table I in the preparation of a 400+ lubricating oil having a VI of 128 after dewaxing at —30° C., were compared in a pilot plant experiment carried out under the following conditions (catalysts tested in the form of 1.5 mm. extrudates):

Feed: the same deasphalted residual oil used in the first and second experiment.
Pressure: 150 kg./cm.²
LHSV: 0.9 l.·l.⁻¹·h.⁻¹
Gas rate: 2500 Nl.·l.⁻¹
Catalyst bed: 250 ml.

The catalysts were used in sulfided form. Sulfidation of the catalysts was carried out by contacting the catalysts at a temperature of 350° C., a pressure of 150 kg./cm.², a weight hourly space velocity (WHSV) of 2 kg.·l.⁻¹·h.⁻¹ and a gas rate of 150 standard liters/kg. feed, with a gas oil containing 1.5% w. sulfur.

In this experiment a superior catalyst should show a temperature requirement of at most 410° C. and a selectivity of at least 35% w.

The results of this experiment are given in Table V.

TABLE V

| Catalyst tested | Temperature requirement, ° C. | Selectivity, percent wt. on feed | $V_k$ 210° F. of 128 VI lubricating oil, cs. |
|---|---|---|---|
| III | 402 | 40 | 10.0 |
| B | 440 | 26 | 9.0 |
| G | 406 | 33 | 9.6 |
| J | 419 | 31 | 9.8 |

The figures given in Tables II–V show that the catalysts I–IV of the invention meet the requirements for a superior catalyst for the production of a VHVI–lubricating oil by hydrocracking, whereas catalysts A–J fail to meet at least one of these requirements.

I claim as my invention:

1. A lubricating oil hydrocracking process utilizing a catalyst comprising from about 0.015 to about 0.10 gram-atom of nickel and from about 0.10 to about 0.25 gram-atom of a second metal, selected from the group consisting of molybdenum and tungsten, per 100 grams of carrier wherein (a) said carrier is a silica-zirconia carrier of about 30 to about 90% by weight of silica and about 10 to about 70% by weight of zirconia, (b) said catalyst has a pore volume of about 0.2 to about 0.8 ml./g. and a specific surface area of about 125 to about 300 m.²/g., and (c) the nickel to said second metal atomic ratio is in the range of from about 0.10:1 to about 0.75:1 to produce HVI- and VHVI-lubricating oils by contacting a high boiling hydrocarbon feedstock under hydrocracking conditions with said catalyst.

2. The process of claim 1 wherein the high boiling hydrocarbon feedstock is a deasphalted residual oil.

3. The process of claim 1 wherein the catalyst is sulfided by contact with a sulfur compound before it is brought into contact with the feedstock.

4. The process of claim 1 wherein the hydrocracking conditions are a temperature of from 350 to 450° C., a pressure of from 50 to 250 kg./cm.², a hydrogen to feed ratio of from 100 to 5000 standard liters of hydrogen per kg. of feed, and a space velocity of from 0.2 to 5.0 kg. feed per liter catalyst per hour.

5. The process of claim 4 wherein the temperature is from 375 to 425° C., the pressure is from 100 to 200 kg./cm.², the hydrogen to feed ratio is from 500 to 2500 standard liters hydrogen per kg. feed and the space velocity is from 0.5 to 1.5 kg. feed per liter catalyst per hour.

References Cited

UNITED STATES PATENTS

| 3,067,127 | 12/1962 | Plank et al. | 208—110 |
| 3,284,340 | 11/1966 | Halik et al. | 208—111 |
| 3,308,055 | 3/1967 | Kozlowski | 208—111 |
| 3,654,133 | 4/1972 | Olson | 208—59 |
| 3,617,484 | 11/1971 | Thompson | 208—59 |
| 3,619,414 | 11/1971 | Mills et al. | 208—143 |

DELBERT E. GANTZ, Primary Examiner

G. E. SCHMITKONS, Assistant Examiner

U.S. Cl. X.R.

208—18, 59, 86, 95; 252—435, 439, 441, 458